United States Patent
Raschke

(10) Patent No.: US 9,170,133 B2
(45) Date of Patent: Oct. 27, 2015

(54) GUIDE SECTION OF A HOUSING FOR A SENSOR HOUSING WITH A SENSOR IN PARTICULAR FOR A VEHICLE TRANSMISSION AND METHOD FOR THE PRODUCTION OF A HOUSING FOR A SENSOR IN PARTICULAR FOR A VEHICLE TRANSMISSION

(75) Inventor: Dirk Raschke, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/240,760

(22) PCT Filed: Jul. 23, 2012

(86) PCT No.: PCT/EP2012/064403
§ 371 (c)(1),
(2), (4) Date: Feb. 25, 2014

(87) PCT Pub. No.: WO2013/029874
PCT Pub. Date: Mar. 7, 2013

(65) Prior Publication Data
US 2014/0208878 A1 Jul. 31, 2014

(30) Foreign Application Priority Data
Aug. 26, 2011 (DE) .......................... 10 2011 081 637

(51) Int. Cl.
*G01D 11/24* (2006.01)
*G01L 19/14* (2006.01)
*G01P 1/02* (2006.01)
*G01D 11/30* (2006.01)
*B29C 45/14* (2006.01)
*B29L 31/34* (2006.01)

(52) U.S. Cl.
CPC .......... *G01D 11/30* (2013.01); *B29C 45/14467* (2013.01); *B29C 45/14639* (2013.01); *G01D 11/245* (2013.01); *B29L 2031/34* (2013.01)

(58) Field of Classification Search
CPC ....................................................... G01D 11/24
USPC ............................................................ 73/431
See application file for complete search history.

(56) References Cited

U.S. PATENT DOCUMENTS 5,969,519 A 10/1999 Steiling et al.
6,404,186 B1 * 6/2002 Schodlbauer .............. 324/207.2
(Continued)

FOREIGN PATENT DOCUMENTS

DE 10 2009 002 005 A1 10/2010
EP 1059506 A2 * 12/2000 ............... G01B 7/00

OTHER PUBLICATIONS

German Search Report, Oct. 2, 2012.
(Continued)

*Primary Examiner* — Lisa Caputo
*Assistant Examiner* — Jamel Williams
(74) *Attorney, Agent, or Firm* — Dority & Manning, P.A.

(57) ABSTRACT

A guide section of a housing for a sensor, in particular for a vehicle transmission, is proposed, whereas the guide section for guiding a movable sensor element of the sensor is formed along a guide axis and has a first guide area, a second guide area, and a third guide area connected to the first guide area and the second guide area. Thereby, a guide surface of the first guide area and a guide surface of the second guide area are arranged opposite to each other. The guide section is characterized in that the second guide area along the guide axis has a plural number of alternately arranged recesses and guide parts.

7 Claims, 3 Drawing Sheets

(56) References Cited

U.S. PATENT DOCUMENTS

2011/0162223 A1* 7/2011 Ellin et al. ................. 33/706
2012/0306479 A1  12/2012 Krause et al.

OTHER PUBLICATIONS

PCT Search Report and Written Opinion, Apr. 4, 2013.
PCT International Preliminary Report on Patentability, Oct. 8, 2013.

* cited by examiner

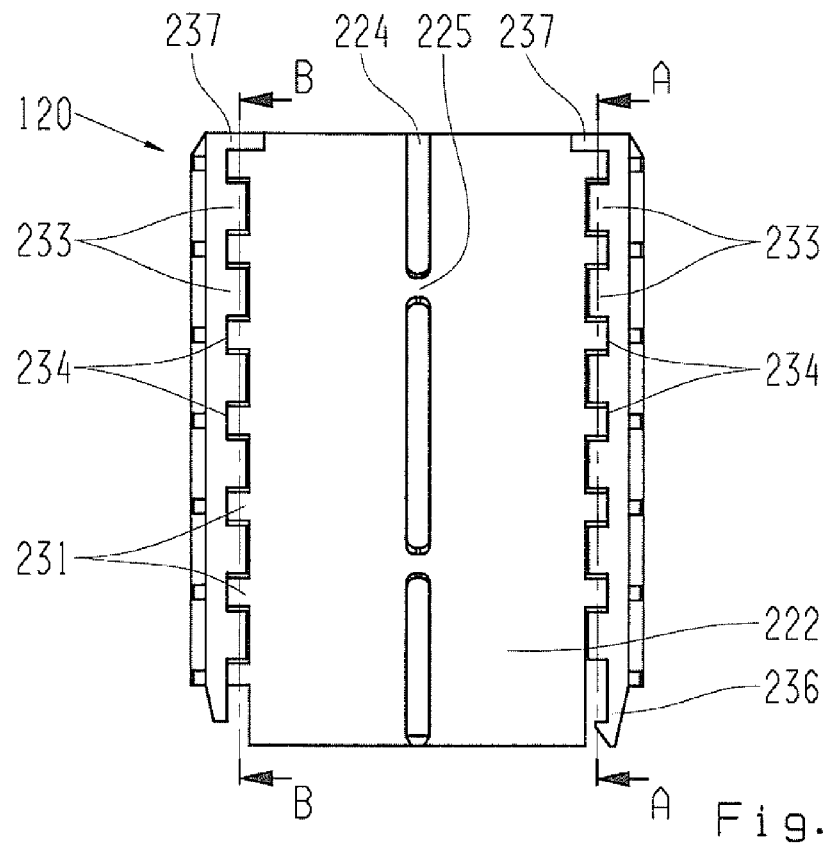
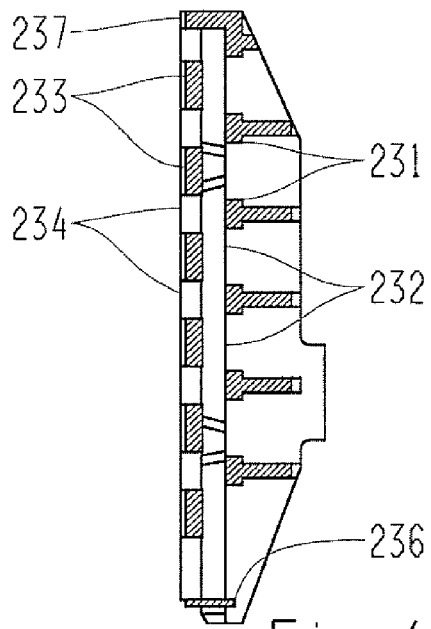
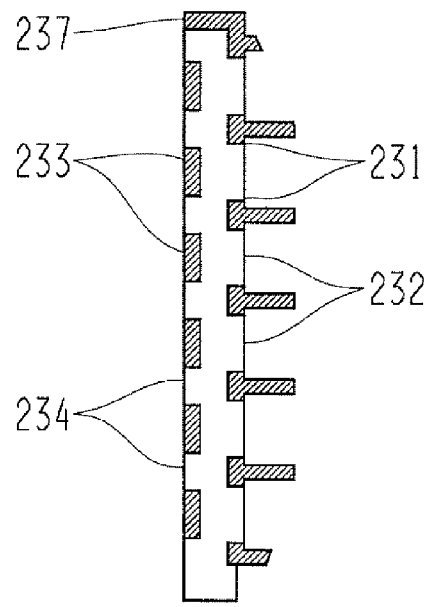

GUIDE SECTION OF A HOUSING FOR A SENSOR HOUSING WITH A SENSOR IN PARTICULAR FOR A VEHICLE TRANSMISSION AND METHOD FOR THE PRODUCTION OF A HOUSING FOR A SENSOR IN PARTICULAR FOR A VEHICLE TRANSMISSION

FIELD OF THE INVENTION

This invention relates to a guide section of a housing for a sensor, in particular for a vehicle transmission, as well as to a housing for a sensor, in particular for a vehicle transmission, to a sensor, in particular for a vehicle transmission, and to a method for the production of a housing for a sensor, in particular for a vehicle transmission.

BACKGROUND

A housing for a position sensor is frequently made from plastic by means of an injection molding technique. If the housing has, for example, an undercut or an indentation for guiding a movable sensor element, moving tool parts, so-called "tool slides," are typically necessary in addition, mostly on the side, or across to the direction of opening of the injection molding tool. Before the injection molding tool can be opened or before the plastic molded part can be ejected, the tool slides must slip out from the injection molding tool.

DE 10 2009 002 005 A1 discloses a position sensor for detecting a position of an element, in particular a transmission element.

SUMMARY OF THE INVENTION

Against this backdrop, this invention creates an improved guide section of a housing for a sensor, in particular for a vehicle transmission, an improved housing for a sensor, in particular for a vehicle transmission, an improved sensor, in particular for a vehicle transmission, and an improved method for the production of a housing for a sensor, in particular for a vehicle transmission, in accordance with the claims. Advantageous arrangements arise from the following description. Additional objects and advantages of the invention will be set forth in part in the following description, or may be obvious from the description, or may be learned through practice of the invention.

This invention is based on the understanding that a guide section of a sensor housing can be formed in such a manner that the guide section has, for example, a geometry with only partial undercuts. A movable sensor element of the sensor can be guided by means of the guide section, whereas the guide section has, in one area, alternately arranged recesses and guide parts.

Advantageously, a housing for a sensor may be cast and demolded on the basis of a formed guide section that is thus formed, with the use of simple injection molding tools and, in particular, without side tool slides. The guiding function of the guide section is retained, even if only partial undercuts are preserved. Therefore, a guide section that is so designed is able to make the production of the housing less complicated, efficient, and cost-effective.

This invention creates a guide section of a housing for a sensor, in particular for a vehicle transmission, whereas the guide section for guiding a movable sensor element of the sensor is formed along a guide axis and has a first guide area, a second guide area, and a third guide area connected to the first guide area and the second guide area, whereas a guide surface of the first guide area and a guide surface of the second guide area are arranged opposite to each other, characterized in that the second guide area along the guide axis has a plural number of alternately arranged recesses and guide parts.

The vehicle may be a motor vehicle, such as a passenger car, truck, or a commercial vehicle, with a manual transmission. The transmission may be a direct shift gearbox or an automatic transmission. The sensor may be a position sensor or a distance sensor or the like. Thereby, the sensor may be designed as a magnetic field sensor. The sensor may have a stationary sensor element and a movable sensor element. The moveable sensor element may be, for example, a magnetic slide or the like. The movable sensor element may move along the guide axis on a housing surface. The guide section is thereby formed to stabilize the movable sensor element in lateral directions to the guide axis, and to guide, steer, or otherwise move it in two directions along the guide axis. The guide section may be a guide rail or the like. Each of the first guide area, the second guide area and/or the third guide area may have a guide surface. Such a guide surface is designed in order to form a contact surface and/or a bearing surface for the movable sensor element. Thus, the movable sensor element may enter into contact with at least one of the guide surfaces, if the movable sensor element is guided by means of the guide section of the housing. The second guide area has at least one recess and a plural number of guide parts. The recesses and guide parts may be arranged alternately along the guide axis. Thus, a recess between two guide parts may be arranged. As such, the guide surface of the second guide area has the alternately arranged recesses and guide parts.

Thereby, the first guide area along the guide axis may have a plural number of alternately arranged openings and support parts. Thereby, one of the individual openings may be arranged opposite to one of the individual guide parts of the second guide area. One of the individual support parts may be arranged opposite to one of the individual recesses of the second guide area. Thus, at one point along the guide axis, an opening of the first guide area and a guide part of the second guide area, or a support part of the first guide area and a recess of the second guide area, may be arranged. Thus, the guide surface of the first guide area has the alternately arranged openings and support parts. Such an embodiment has the advantage that partial undercuts may be produced in the form of guide parts of the second guide area on the basis of openings in the first guide area opposite to the guide parts, in a particularly simple manner, by means of an injection molding process without tool slides, i.e. by means of so-called "on-off tools." Thus, the guide section and/or the housing may be produced in a cost-effective and quick manner by means of simple injection molding tools.

In accordance with one embodiment, the first guide area, the second guide area and the third guide area may form a U-shaped cross-sectional profile of the guide section. Thereby, the guide parts of the second guide area may be formed as projections with respect to the third guide area. Moreover, the recesses of the second guide area may represent gaps, intermediary spaces or the like between neighboring guide parts and/or projections. Thus, the guide parts and recesses may form a pinnacle-shaped profile of the second guide area. In particular, the third guide area may extend orthogonally and/or orthogonally within manufacturing tolerances to the first and/or the second guide area. Such an embodiment has the advantage that a movable sensor element may be guided reliably, accurately and securely by means of the guide section that is formed in such a manner.

In particular, the first guide area may be formed by an edge area of a housing surface for guiding the movable sensor element. Thus, the guide section may extend along a side edge of the housing surface. The housing surface may be a housing surface along which a movement of the movable sensor element in the guide axis may take place. Such an embodiment has the advantage that the guide section may be integrated into the housing in a space-saving manner. Moreover, the stability of the guide section may be increased.

A stop area for limiting the movement of the movable sensor element along the guide axis may also be provided. Thereby, the stop area may be arranged at a first end of the guide section. The stop area may be formed, for example, as a part of the third guide area, in particular as a projection, which extends from the third guide area in the same direction as the guide parts, but in a plane orthogonal to the guide parts. Thus, the stop area may limit a movement of the movable sensor element along the guide axis in one direction. Such a stop area has the advantage that a movable sensor element in the guide section may be guided along a movement path with a defined end. Thus, the falling out of the movable sensor element at the first end of the guide section, where the stop area is provided, can be prevented. Thus, security and accuracy in the guidance of the movable sensor element may be improved.

In addition, the third guide area may also have, at a second end of the guide section, a flexible locking element for limiting the movement of the movable sensor element along the guide axis. The second end of the guide section may be arranged in a manner turned away from the first end, at which the stop area can be provided. Thus, the flexible locking element is provided at another end of the guide section as the stop area. The flexible locking element may be designed elastically sprung, in order to be able to carry out a movement orthogonal to the guide axis. The flexible locking element may have, for example, a clip on an elastically sprung arm or the like. The flexible locking element could allow, for example, a contribution of a movable sensor element in the guide section, whereas the flexible locking element may spring from a resting position against a direction of extension of the guide parts in a deflecting position. If the movable sensor element is inserted into the guide section, the flexible locking element may spring back into the resting position. In this state, the flexible locking element may represent a stop and/or a locking device of the movable sensor element on the second end of the guide section. For the removal of the movable sensor element from the guide section, the flexible locking element can be deflected into the deflecting position. Such a flexible locking element has the advantage that the guide section may securely guide a movable sensor element, in a manner that protects it from falling out.

Thus, the guide section may be produced by means of an injection molding process in a single piece made of a plastic material. Such an embodiment has the advantage that the guide section and/or the housing may be produced in a simple and cost-effective manner, even in large quantities.

This invention also creates a housing for a sensor, in particular for a vehicle transmission, whereas the housing has a housing surface for guiding a movable sensor element of the sensor along a guide axis, characterized by at least one aforementioned guide section, which is arranged along one side of the housing surface.

The housing may be a housing designed in two parts or multiple parts, whereas the guide section is arranged on one housing part. In conjunction with the housing, an aforementioned housing part may be advantageously deployed or used, in order to facilitate the reliable, secure and accurate guidance of a movable sensor element on the housing.

In accordance with one embodiment, a first guide section, which is arranged along a first side of the housing surface, a second guide section, which is arranged along a second side of the housing surface opposite to the first side, and one at least partially broken off guide rib for guiding the movable sensor element, which is arranged on the housing surface between the first guide section and the second guide section, and extends along the guide axis, may be provided. Such an embodiment has the advantage that a movable sensor element may be guided particularly accurately and securely in this manner.

This invention also creates a sensor, in particular for a vehicle transmission, whereas the sensor has a movable sensor element, characterized in that the sensor has one aforementioned housing, and the movable sensor element is movably incorporated in the at least one guide section of the housing.

In conjunction with the sensor, one aforementioned housing may be advantageously deployed or used to guide an element of the sensor movably and exactly defined in terms of position.

This invention also creates a method for the production of a housing for a sensor, in particular for a vehicle transmission, whereas the housing has a housing surface for guiding a movable sensor element of the sensor along a guide axis, and at least one guide section arranged along one side of the housing surface for guiding the movable sensor element of the sensor along the guide axis. The guide section has a first guide area, a second guide area and a third guide area connected to the first and the second guide area, whereas one guide surface of the first guide area and one guide surface of the second guide area are arranged opposite to each other. The second guide area along the guide axis has a plural number of alternating recesses and guide parts. The method has a step of pressing together two tool halves, in order to produce a molding cavity, whereas an uneven division plane is formed between the two tool halves in the pressed-together state. A first of the two tool halves has first projections for the formation of the guide surface of the first guide area, and a second of the two tool halves has second projections for the formation of the guide surface of the second guide area. The method includes a step of the injection of plastic material in the molding cavity, in order to cast the housing, and a step of moving the two tool halves away from each other through the movement of the two tool halves in opposite directions along a common demolding axis, in order to demold the cast housing.

In connection with the method, an aforementioned housing may be produced advantageously. The tool halves may be injection molding tools. The tool halves need not be halves; rather, they can be divided in another manner, for example one-quarter and three-quarters. Thus, the tool halves may be two tool parts that enclose the molding cavity when the tool halves are pressed together. The molding cavity may be a hollow space in which, for example, liquefied plastic material can be injected. Thus, the housing is molded in the molding cavity. Therefore, the tool halves that are pressed together form the mold for the housing. The spaces in which the tool halves touch each other form the division plane of the tool halves. The division plane need not be plane or level. The projections of the tool halves may protrude over other areas of the tool halves, and thus form an uneven division plane. Thus, projections of one tool half may further project into the other tool half, as the usual areas of the tool half, and vice versa. Upon demolding, the pressed-together tool halves may be once again removed from each other. Thus, the cast housing may be uncovered and removed.

BRIEF DESCRIPTION OF THE DRAWINGS

The invention is more specifically illustrated as an example on the basis of the attached drawings. The following is shown:

FIG. 3 is a top view of a housing of a sensor for a vehicle transmission, in accordance with one embodiment of this invention;

FIGS. 4A and 4B are cross-sectional views of guide sections of a housing of a sensor for a vehicle transmission, in accordance with one embodiment of this invention.

DETAILED DESCRIPTION

Figure 1:
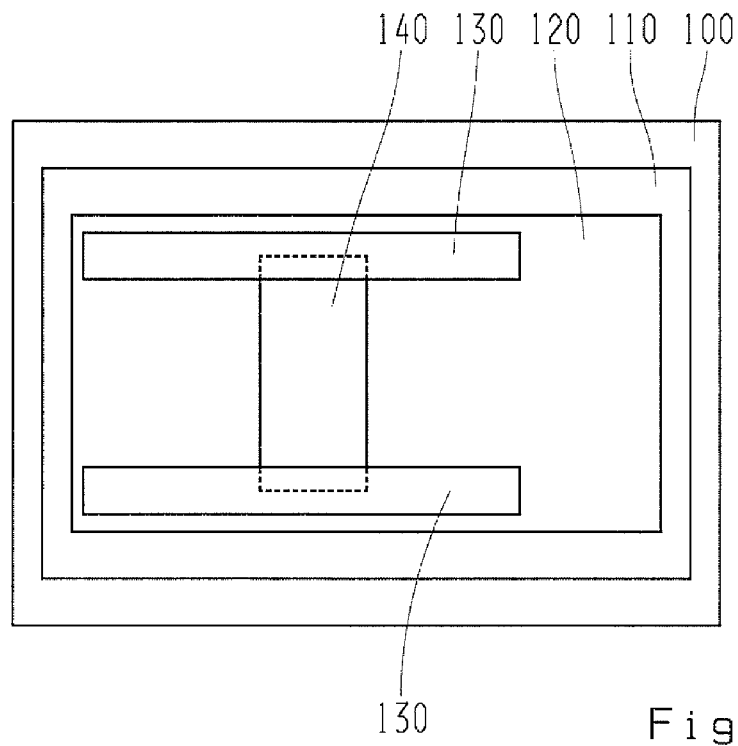
FIG. 1 is a schematic representation of a motor vehicle with a sensor for a vehicle transmission, in accordance with one embodiment of this invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In the following description of the preferred embodiments of the present invention, elements shown in the various figures and elements having similar effects use the same or similar reference signs, whereas a repeated description of such elements is omitted.

FIG. 1 shows a schematic representation of a motor vehicle 100 with a sensor 110 for a vehicle transmission, in accordance with one embodiment of this invention. The sensor 110 is formed by a housing 120 with, for example, two guide sections 130 and a movable sensor element 140. The sensor 110 may be a position sensor, for example. Even if they are not shown in FIG. 1, the sensor 110 may have other elements, for example, electronic elements, sensor elements and the like. The two guide sections 130 of the housing 120 are arranged along opposite side edges of the housing 120 and/or a housing surface of the housing 120. The two guide sections 130 have a common main extension direction. The common main extension direction of the two guide sections 130 thereby corresponds to a guide axis, along which the movable sensor element 140 between a first end and a second end of the two guide sections 130 may be guided, and/or movably arranged, by means of the two guide sections 130. The moveable sensor element 140 may be, for example, a magnetic slide.

Figure 2:
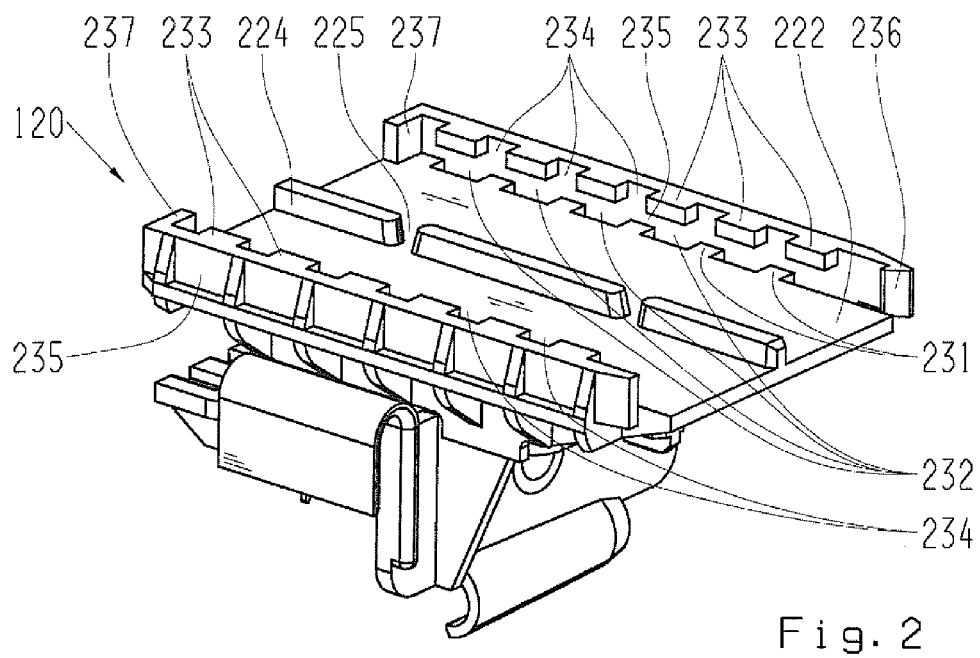
FIG. 2 is a perspective representation of a housing of a sensor for a vehicle transmission, in accordance with one embodiment of this invention.

FIG. 2 shows a perspective view of a housing 120 of a sensor for a vehicle transmission, in accordance with one embodiment of this invention. The housing 120 may be the housing from FIG. 1. A housing surface 222 with a guide groove 224 along with gaps 225 in the guide groove, and two guide sections for guiding a movable sensor element of the sensor along a guide axis, are shown. A first of the two guide sections is formed from a first guide area, which has support parts 231 along with openings 232, a second guide area, which has guide parts 233 along with recesses 234, a third guide area 235 with a locking element 236 and a stop area 237. In the background of FIG. 2, the first guide section is shown. A second of the two guide sections corresponds to the first guide section, with the exception that the third guide area 235 is formed without the locking element 236. In the foreground of FIG. 2, the second guide section is shown.

The housing 120 has a plate-shaped main body. The housing 120 has the housing surface 222 on the main surface of the plate-shaped main body. The housing surface 222 is formed planar and/or plane or level. The housing surface 222 and/or the plate-shaped main body of the housing 120 has, for example, a plan view that is essentially rectangular. The guide groove 224 extends on the housing surface 222 in a straight line from one end of the plate-shaped main body and/or the housing surface 222 to one opposing end of the plate-shaped main body and/or the housing surface 222. In particular, the guide groove 224 extends on the housing surface 222 in a straight line from one narrow side edge of the plate-shaped main body to an opposing narrow side edge of the plate-shaped main body. The guide groove 224 extends along a guide axis, along which the movable sensor element in the guide sections is able to move. The guide groove 224 is formed as an elongated projection or an elongated elevation with regard to the housing surface 222. In accordance with the embodiment of this invention presented in FIG. 2, the guide groove 224 has three sections. In other words, the guide groove 224 has two gaps 225 and/or break points. In one area of the gaps 225, with respect to the housing surface 222, the height of the guide grove 224 amounts to zero.

The two guide sections are arranged in two opposite edge areas of the plate-shaped main body of the housing 120. In particular, the two guide sections extend along the opposing long side edges of the plate-shaped main body and/or the housing surface 222 of the housing 120. The two guide sections extend along the guide axis. The guide sections are guide rails for a movable sensor element, such as a magnetic slide of the sensor. The arrangement and alignment of elements or characteristics of the first of the two guide sections are, with the exception of the locking element 236, mirror images of the second of the two guide sections, whereas a mirror plane may be represented by a longitudinal extension towards the guide groove 224. Of the second of the two guide sections, in the perspective view in FIG. 2, only the third guide area 235, more specifically an outer surface of the third guide area 235 turned away from a guide surface, and the guide parts 233 and recesses 234 of the second guide area, are shown. On the outer surface of the third guide area 235, a plural number of ribs are arranged along the guide axis in a manner spaced from each other; and extend across to the guide axis. In the following, the first of the two guide sections is described as the guide section representing both guide sections, whereas the structure of the first of the guide sections corresponds to the structure of the second of the guide sections, with the exception that only the first of the two guide sections has the locking element 236.

The first guide area of the guide section is formed by the edge area of the long edge side of the housing surface 222, along which the guide section extends. Along the guide axis, the first guide area of the guide section and/or the edge area of the long edge side of the housing surface 222 has a series of alternately arranged openings 232 and support parts 231. In accordance with the embodiment shown in FIG. 2, the example of six openings 232 and the example of six support parts 231 are shown. The openings 232 may be slots or through-holes. The openings 232 may also be understood as recesses in the housing surface 222 and/or the surface side of the housing 120. The first guide area may be, for example, connected only in the area of the support parts 231 with the third guide area 235.

The third guide area 235 extends essentially orthogonally, within manufacturing tolerances, to the first guide area. The third guide area 235 is formed as a continuous wall. The third guide area 235 connects the first guide area and the second guide area. The locking element 236 is arranged on one end of the third guide area 235 presented at the right in FIG. 2. The locking element 236 may be formed as a flexible locking element. The locking element 236 may be formed in order to be elastically deformable in a direction away from the guide rib 224. The locking element 236 may have a flexible section, which is not connected to the first guide area, for this. This locking element 236 may also have a locking section in the form of a hook, a projection or the like. The locking section may be arranged at a free end of the flexible section.

The second guide area extends essentially orthogonally, within manufacturing tolerances, to the third guide area 235. The second guide area extends essentially parallel, within manufacturing tolerances, to the first guide area. Along the guide axis, the second guide area of the guide section has a series of alternately arranged recesses 234 and guide parts 233. In accordance with the embodiment shown in FIG. 2, the example of six recesses 234 and the example of six guide parts 233 are shown. The guide parts 233 may be projections with respect to the third guide area 235. The guide parts 233 extend essentially orthogonally, within manufacturing tolerances, away from the third guide area 235. Thus, the second guide area along the guide axis may have a pinnacle-shaped profile of the recesses 234 and the guide parts 233.

The stop area 237 of the guide section is arranged on one end of the guide section presented at the left of FIG. 2. The stop area 237 comprises a wall element, which extends essentially orthogonally, within manufacturing tolerances, to the third guide area 235 and to the first and/or second guide area. Thus, the stop area 237 is arranged at one end of the guide section turned away from the locking element 236. The stop area is connected to the third guide area 235 and the first guide area and/or the edge area of the long-side edge of the housing surface 222. The stop area 237 may also represent a part of the third guide area 235 angled by essentially 90 degrees to the guide groove 224.

FIG. 3 shows a top view of a housing 120 of a sensor for a vehicle transmission, in accordance with one embodiment of this invention. The housing 120 may be the housing from FIG. 1 and/or FIG. 2. Thereby, FIG. 3 may show the housing from FIG. 2 from a different perspective. Specifically, in the presentation of FIG. 3, the housing from FIG. 2 is presented in a top view of the housing surface. In FIG. 3, the openings of the first guide area of the guide section are covered by the guide parts 233 of the second guide area. The support parts 231 of the first guide area are visible in the area of the recesses 234 of the second guide area. Thus, in FIG. 3, the alternating arrangement of the recesses 234 and the guide parts 233 of the second guide area is visible. It is also recognizable that, in the second guide section, the guide parts 233 of the second guide area are arranged over the openings of the first guide area, and the recesses 234 of the second guide area are arranged over the support parts 231 of the first guide area. Thus, the guide parts 233 of the second guide area and the openings of the first guide area are aligned against each other. Likewise, the recesses 234 of the second guide area and the support parts 231 of the first guide area are aligned against each other. The guide parts 233 of the second guide area and the openings of the first guide area may, apart from manufacturing-related deviations, have the same size and the same shape. Likewise, the recesses 234 of the second guide area and the guide parts 231 of the first guide area may, apart from manufacturing-related deviations, have the same size and the same shape.

Moreover, in FIG. 3, a first cutting line A-A through the guide section with the locking element 236, along with a second cutting line B-B through the guide section without the locking element 236, are shown. The cutting lines run along the guide axis through the entire guide section, whereas the guide parts 233 are cut by the cutting lines.

FIG. 4A shows a cross-sectional view of a guide section of a housing of a sensor for a vehicle transmission, in accordance with one embodiment of this invention, along the cutting line A-A from FIG. 3. Thus, the guide section may be the guide section shown at the right in FIG. 3. The cross-sectional view of FIG. 4A shows the support parts 231, the openings 232, the guide parts 233, the recesses 234, the locking element 236 and the stop area 237.

FIG. 4B shows a cross-sectional view of a guide section of a housing of a sensor for a vehicle transmission, in accordance with one embodiment of this invention, along the cutting line B-B from FIG. 3. Thus, the guide section may be a guide section shown at the left in FIG. 3. The cross-sectional view of FIG. 4B shows the support parts 231, the openings 232, the guide parts 233, the recesses 234 and the stop area 237.

In FIGS. 4A and 4B, along the guide axis, the alternating arrangement of the support parts 233 and the recesses 234 in the second guide area, the alternating arrangement of the support parts 231 and the openings 232 in the first guide area and the offset arrangement of the support parts 231 and the guide parts 233 are recognizable. Each support part 231 is arranged opposite to an individual recess 234. Each guide part 233 is arranged opposite to an individual opening 231.

Figure 5:
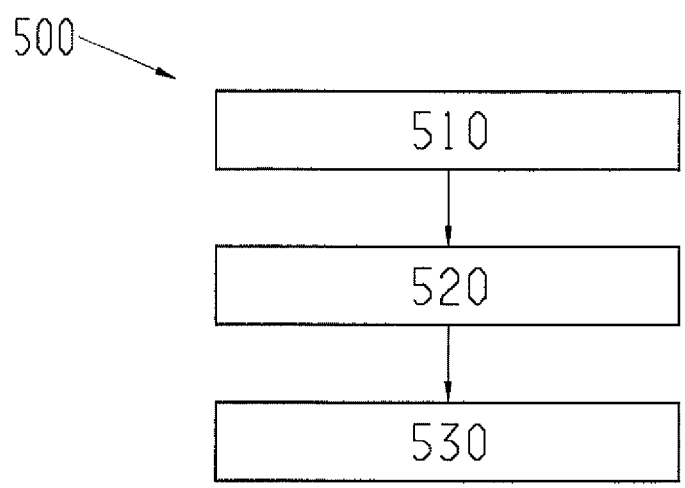
FIG. 5 is a flow chart of a method in accordance with one embodiment of this invention.

FIG. 5 shows a flow chart of a method 500 for the production of a housing for a sensor, in particular for a vehicle transmission, in accordance with one embodiment of this invention. Thereby, the housing has a housing surface for guiding a movable sensor element of the sensor along a guide axis, and at least one guide section arranged along one side of the housing surface for guiding the movable sensor element of the sensor along the guide axis. Moreover, the guide section has a first guide area, a second guide area and a third guide area connected to the first and second guide areas. Furthermore, a guide surface of the first guide area and a guide surface of the second guide area are arranged opposite to each other. In addition, the second guide area along the guide axis thereby has a plural number of alternating recesses and guide parts. The method 500 has a step of pressing together 510 of two tool halves, in order to produce a molding cavity. Thereby, an uneven division plane is formed between the two tool halves in the pressed-together state. Thereby, a first of the two tool halves has first projections for the formation of the guide surface of the first guide area. A second of the two tool halves has second projections for the formation of the guide surface of the second guide area. The method 500 also has a step of the injection 520 of plastic material in the molding cavity, in order to cast the housing. The method 500 also has a step of moving the two tool halves away from each other 530 through the movement of the two tool halves in opposite directions along a common demolding axis, in order to demold the cast housing. In connection with the method, a housing for a sensor, such as the housing from FIG. 2 and/or FIG. 3, may be advantageously produced.

Below, with reference to FIGS. 1 to 5, one embodiment of this invention is described in summary. Initially, the background is briefly described. The manufacturing method may pose a problem for known position sensors. Since the components that are used are made of plastic (for example) and are injected. Expensive tools are typically used in order to be able to produce the undercut of the slide rail. Undercuts in injection tools cannot be demolded without additional tool parts (tool slides) that typically move on the side to the direction of opening of the tool. Before the tool can be opened, and/or before the plastic molded part can be ejected, the tool slides must be slipped out of the tool. Under certain circumstances, it is even the case that an additional tool part must be moved away before the tool slides can even be drawn. Thus, an elaborate tool design is necessary for producing the desired design of the plastic part.

In accordance with one embodiment of this invention, the guide section 130 of the sensor housing 120 and/or the side guidance for the movable sensor element is improved. The housing component 120 used for the position sensor 110 with the guide section 130 and/or the slide rail is designed in such a manner that simple tool halves or injection molding tools can be used. The housing 120 is constructed in such a manner that alternating arranged recesses 232, 234 and guide parts 231, 233 are found on the guide section 130 or the side guide. Such a geometry may be demolded without tool slides. The two tool halves plunge into each other and form hollow spaces, which are filled with plastic during the injection process. Through the special geometry in accordance with this invention, the tool halves may be pulled apart again without destroying the housing 120. Thus, so-called "on-off tools" may be used. The recesses 232 in the first guide area of the guide section 130 at the spot of the partial undercuts are represented by the tool that is plunged through. As such, they are exactly opposite to the guide parts 233 of the second guide area of the guide section 130. This partial undercut is sufficient for securely guiding the movable sensor element 140 and/or the magnetic slide.

The embodiments described and shown in the figures are only selected as examples. Different embodiments may be combined with one another, completely or in reference to individual characteristics. Moreover, one embodiment may be supplemented by the characteristics of another embodiment.

The invention claimed is:

1. A housing for a sensor, such as a vehicle transmission sensor, comprising:
  a guide section for a movable sensor element, the guide section having a guide axis along which the sensor element moves;
  the guide section further comprising:
  a first guide area, a second guide area, and a third guide area connected to the first guide area and the second guide area;
  the first guide area and the second guide area having respective guide surfaces arranged opposite to each other;
  the second guide area having a plurality of alternately arranged recesses and guide parts arranged along the guide axis; and
  wherein the first guide area comprises a plurality of alternately arranged openings and support parts arranged along the guide axis, the opening arranged opposite to the guide parts of the second guide area.

2. The housing for a sensor as in claim 1, wherein the first guide area, the second guide area, and the third guide area combine to form a U-shaped cross-sectional profile of the guide section, and wherein the guide parts of the second guide area comprise projections relative to the third guide area.

3. A housing for a sensor, such as a vehicle transmission sensor, comprising:
  a guide section for a movable sensor element, the guide section having a guide axis along which the sensor element moves;
  the guide section further comprising:
  a first guide area, a second guide area, and a third guide area connected to the first guide area and the second guide area;
  the first guide area and the second guide area having respective guide surfaces arranged opposite to each other;
  the second guide area having a plurality of alternately arranged recesses and guide arranged along the guide axis; and
  further comprising a housing surface along which the movable sensor element moves, the first guide area defined along an edge of the housing surface.

4. A housing for a sensor, such as a vehicle transmission sensor, comprising:
  a guide section for a movable sensor element, the guide section having a guide axis along which the sensor element moves;
  the guide section further comprising:
  a first guide area, a second guide area, and a third guide area connected to the first guide area and the second guide area;
  the first guide area and the second guide area having respective guide surfaces arranged opposite to each other;
  the second guide area having a plurality of alternately arranged recesses and guide parts arranged along the guide axis; and
  further comprising a stop defined at a first end of the guide section to limit movement of the movable sensor element along the guide section.

5. The housing for a sensor as in claim 4, further comprising a flexible locking element at a second opposite end of the guide section to limit movement of the movable sensor element along the guide section.

6. The housing for a sensor as in claim 1, wherein said guide section comprises a single injection molded piece of plastic material.

7. A housing for a sensor, such as a vehicle transmission sensor, comprising:
  a guide section for a movable sensor element, the guide section having a guide axis along which the sensor element moves;
  the guide section further comprising:
  a first guide area a second guide area, and a third guide area connected to the first guide area and the second guide area;
  the first guide area and the second guide area having respective guide surfaces arranged opposite to each other;
  the second guide area having a plurality of alternately arranged recesses and guide parts arranged along the guide axis; and
  further comprising a housing surface along which the movable sensor element moves, the first guide area defined along a first side of the housing surface, and a second guide area defined along a second opposite side of the housing surface, and a guide rib arranged on the housing surface between the first guide area and the second guide area.

* * * * *